United States Patent [19]

Funkhouser

[11] 4,262,846
[45] Apr. 21, 1981

[54] METHOD FOR THE DISTRIBUTION OF BIOLOGICALLY ACTIVE CHEMICALS

[75] Inventor: William A. Funkhouser, Tonopah, Ariz.

[73] Assignee: Albany International Corp., Needham Heights, Mass.

[21] Appl. No.: 947,453

[22] Filed: Oct. 2, 1978

[51] Int. Cl.³ .............................................. B05B 17/00
[52] U.S. Cl. ....................................... 239/1; 239/687; 239/171; 427/2; 427/4
[58] Field of Search ............... 427/4, 207 R, 212, 245, 427/428; 118/76, 230, 244, 308; 239/171, 681, 1, 687

[56] References Cited

U.S. PATENT DOCUMENTS 3,232,006  2/1966  Atherton et al. ..................... 47/1.5
3,987,966  10/1976  Ruda et al. ........................... 239/687
3,994,437  11/1976  Kitterman .............................. 239/1

Primary Examiner—Sam Silverberg
Attorney, Agent, or Firm—Gregory J. Nelson

[57] ABSTRACT

A method and apparatus for evenly dispersing trace quantities of biologically active chemicals encapsulated in a microdispenser which utilizes a rotating applicator device. The apparatus includes a hopper for the dispenser and means for moving the dispensers to the applicator device. A "sticker" substance is mixed with the dispensers. In one embodiment the applicator device consists of a rotating cone and the dispensers are deposited on a surface of the cone for dispersion. In another embodiment, the applicator consists of a rotating drum or wheel for contact application of the dispensers to living organisms.

6 Claims, 8 Drawing Figures

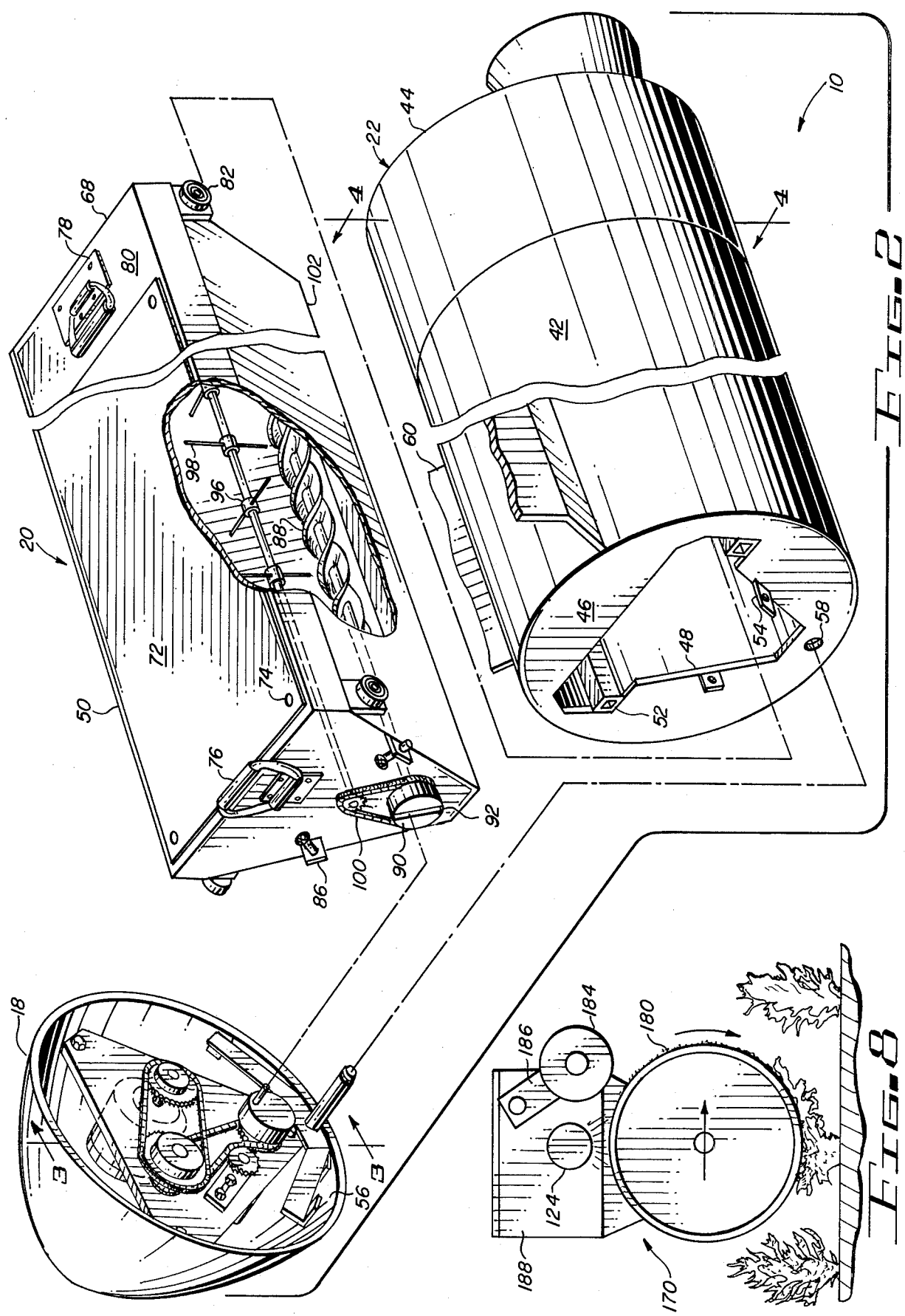

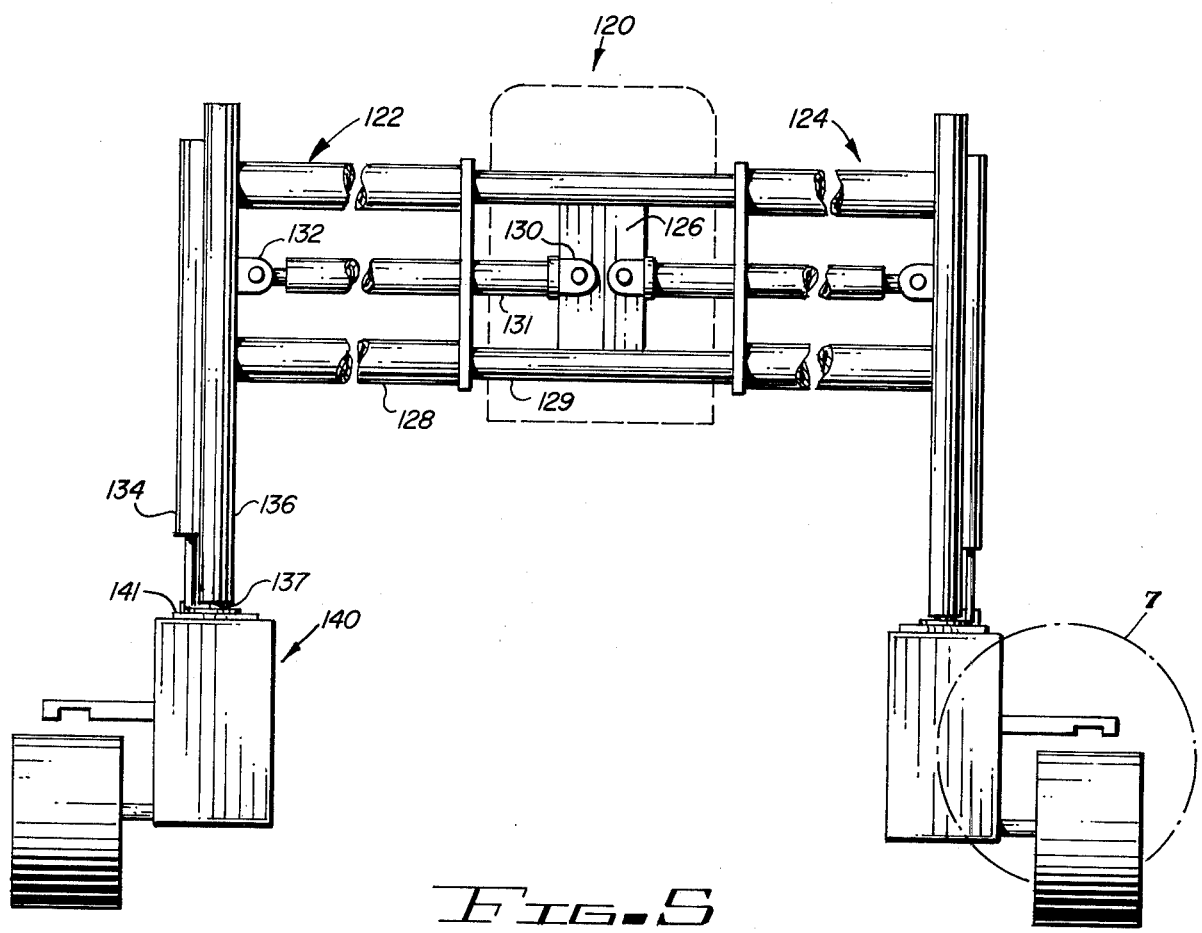

METHOD FOR THE DISTRIBUTION OF BIOLOGICALLY ACTIVE CHEMICALS

The present invention relates to an application apparatus for chemicals and more particularly to a method and apparatus for the ground or airborne dispersion and application of biologically active chemicals of the ultra low volume type (ULV).

For many years various biologically active chemicals, such as insecticides, fungicides, herbicides and fertilizers have been disseminated or distributed by broadcast techniques over large areas of cropland, forest and fields. Application rates of these chemicals has been relatively high, sometimes these chemicals are applied at the rate of several hundred pounds or gallons per acre. For example, since its introduction after World War II and until recently the compound known as dichloro-diphenyl-trichloro-ethane (DDT) was one of the most significant chemicals used in insect control. DDT and other similar chlorine derivatives such as chlordane, aldrin, toxaphene and phosphorous based insecticides such as parathion and malathion were widely and indiscriminately distributed by aircraft or tank-spraying devices. However, since these chemicals degrade or breakdown very slowly, use of these chemicals has been restricted and in some cases entirely banned because of the long-term environmental effects.

Accordingly, agriculturists have turned to other methods of insect control. Entomologists and agricultural scientists have developed new chemicals and biological controls. For example, hormones are commonly used which affect the growth of insects. Pheromones have also been developed which elicit specific responses in certain insect species. The pheromone exuded by female insects may draw males of the same species from a large area. Capitalizing on the attraction of sex pheromones for specific species, pest control experts have been using these compounds to lure insects into traps where they can be killed or counted to help entomologists determine whether further anti-pest activities such as application of conventional insecticides may be necessary. Thus, the behavior of various insects species can be effectively regulated by providing an appropriate pheromone at a selected location in a crop, field or otherwise geographical area.

One pheromone is designated "Gossyplure H. F." which is a trademark of Conrel, an Albany International Corporation, is an attractant for the pink bollworm moth which disrupts the mating cycle of the moth. This pheromone may be applied in a quantity as small as one gram per acre. Similarly, pheromones such as Frontalin have been isolated for attracting pine beetles for the control of this insect. These new substances are often designated ultra low volume (ULV) chemicals and are often in the form of plastic dispensers, which may be hollow and which encapsulate the biologically active chemical.

The use of these new chemicals has required the development of new equipment and apparatus for disseminating these substances. Conventional dispersion methods are not adaptable for use with the new compounds. For example, pheromones are often applied at the rate of several grams per acre. U.S. Pat. No. 3,994,437 entitled "Broadcast Dissemination of Trace Quantities of Biologically Active Chemicals", commonly assigned with the present application, discloses certain apparatus for disseminating these chemicals in which the chemicals are conveyed to a distributor in an air conduit. The apparatus shown in the aforementioned application has been successful and is satisfactory for many applications. However, in some instances other means of dispensing minute or trace quantities of these biologically active materials are necessary. Since the substances are spread in relatively small quantities, conventional agricultural vehicles are not well-suited for the distribution of these substances. Accordingly, it is highly desirable to provide an improved method and apparatus useful for evenly and accurately dispensing and disseminating minute quantities of biologically active materials of the ULV type such as insect pheromones encapsulated in a dispenser in order to increase the effectiveness of the chemical and to reduce quantities of the chemicals required to obtain a given effect.

Briefly, in accordance with the present invention, an apparatus for a broadcast dispersion of trace quantities of biologically active chemicals over pre-selected areas is provided which includes a hopper for receiving the chemicals. An auger for transferring the chemicals from the hopper to a distributor is provided in the hopper. A "sticker" substance may be directly added to the hopper or may be metered to the hopper from a separate tank under the influence of a piston or valve. The sticker substance serves to coat the outer surface of the microdispensers with a substance adapted to facilitate attachment of the microdispensers to plants. In one form of the apparatus, the discharge from the hopper communicates with the interior of a dispersion device which is in the form of a truncated cone rotating at a pre-determined speed. The dispensers are moved along the interior surface of the cone and discharged tangentially from the cone to adhere to the living organism. In another form of the invention, the discharge from the auger directed to the surface of a rotating drum or wheel. The drum is positioned to contact the plants and the chemical dispensers are transferred to the living organisms and adhere to the organism. The apparatus may be adapted for use with ground application vehicles or with aircraft. The method involves distributing and dispersing by depositing coated microdispensers on a surface of a rotating distributing cone.

The above and other objects of the present invention will become more apparent from the following description, claims and drawings in which:

FIG. 2 is an exploded perspective view illustrating several of the major components of the dispersion apparatus shown in FIG. 1;

FIG. 5 is a front view of another embodiment of the dispersion apparatus shown in conjunction with a carriage assembly for mounting on a ground traversing vehicle;

FIG. 6 is a sectional view of the portion of the dispersion apparatus as indicated in FIG. 5;

FIG. 8 is a view of the roller applicator device shown in FIG. 7 illustrating the transfer of microdispensers from the roller to plant organisms.

The biologically active chemical is encapsulated for use in a microdispenser by any of several convenient techniques known to persons skilled in the art. For example, the chemical can be encapsulated within a permeable integement according to the general technique described in the U.S. Pat. No. 3,539,465 and U.S. Pat. No. 3,577,515 or within zero-order release devices of the general type disclosed in U.S. Pat. No. 3,851,648. The biologically active chemical can be contained or encapsulated in a laminated microdispenser such as the material known as Hercon which contains a porous chemical containing layer between two outer laminae. The material may also be a hollow fiber containing a pheromone such as the type sold by Conrel, an Albany International Company, under the trademark "Gossyplure H. F." in which a pheromone is contained by sealing or by capillary action within a hollow fiber. These hollow fillament conduits are known in the art and may be made from any one of a number of natural or synthetic polymeric materials. Useful materials include polyesters, polyolefins, acrylics, modacrylics, polyamides and the like. The selection of the appropriate encapsulating material will be governed by considerations of chemical compatibility or inertness of the fiber material with the chemical agent and formulation to be incorporated and released from the filament. Thus, the microdispensers may be selected from a wide range of materials and may take a wide range of shapes and sizes and can contain a variety of biologically active materials. After the microdispensers have been filled with a biologically active material, they are ready for dissemination or distribution. For convenience, this general type of chemical will be referred to as "dispensers" in this application regardless of the specific chemical and type of encapsulation involved.

Figure 1:
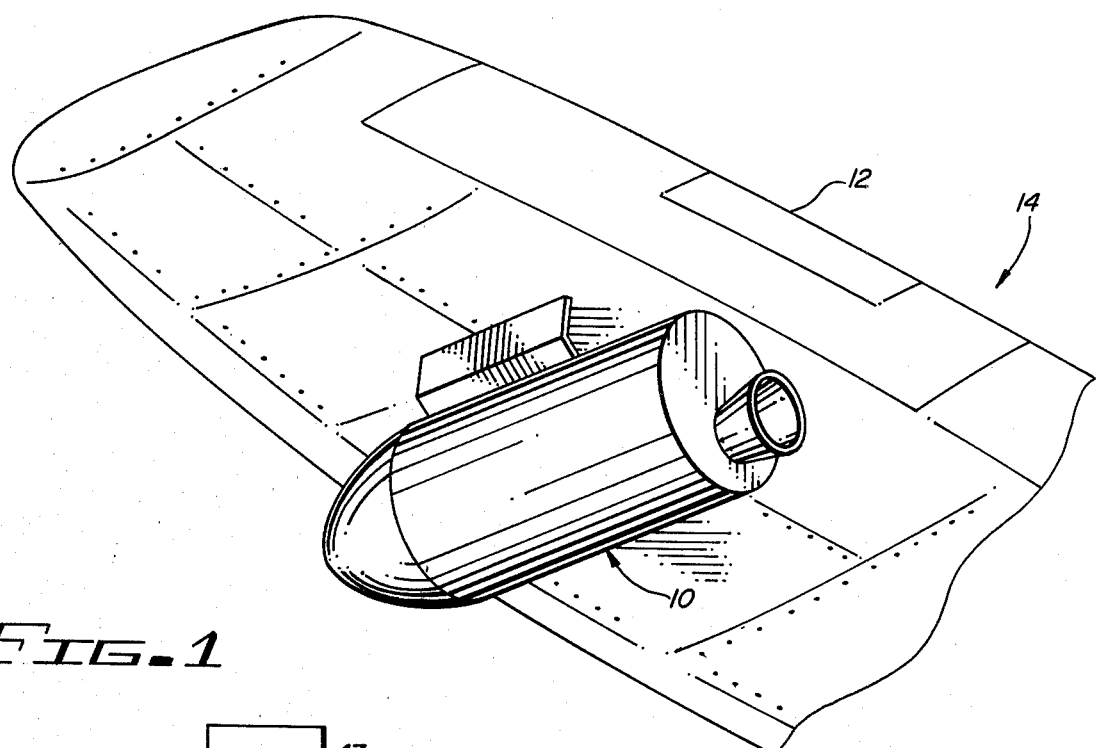
FIG. 1 is a perspective view of an aircraft with the dispersion apparatus of the present invention mounted thereon.
Figure 3:
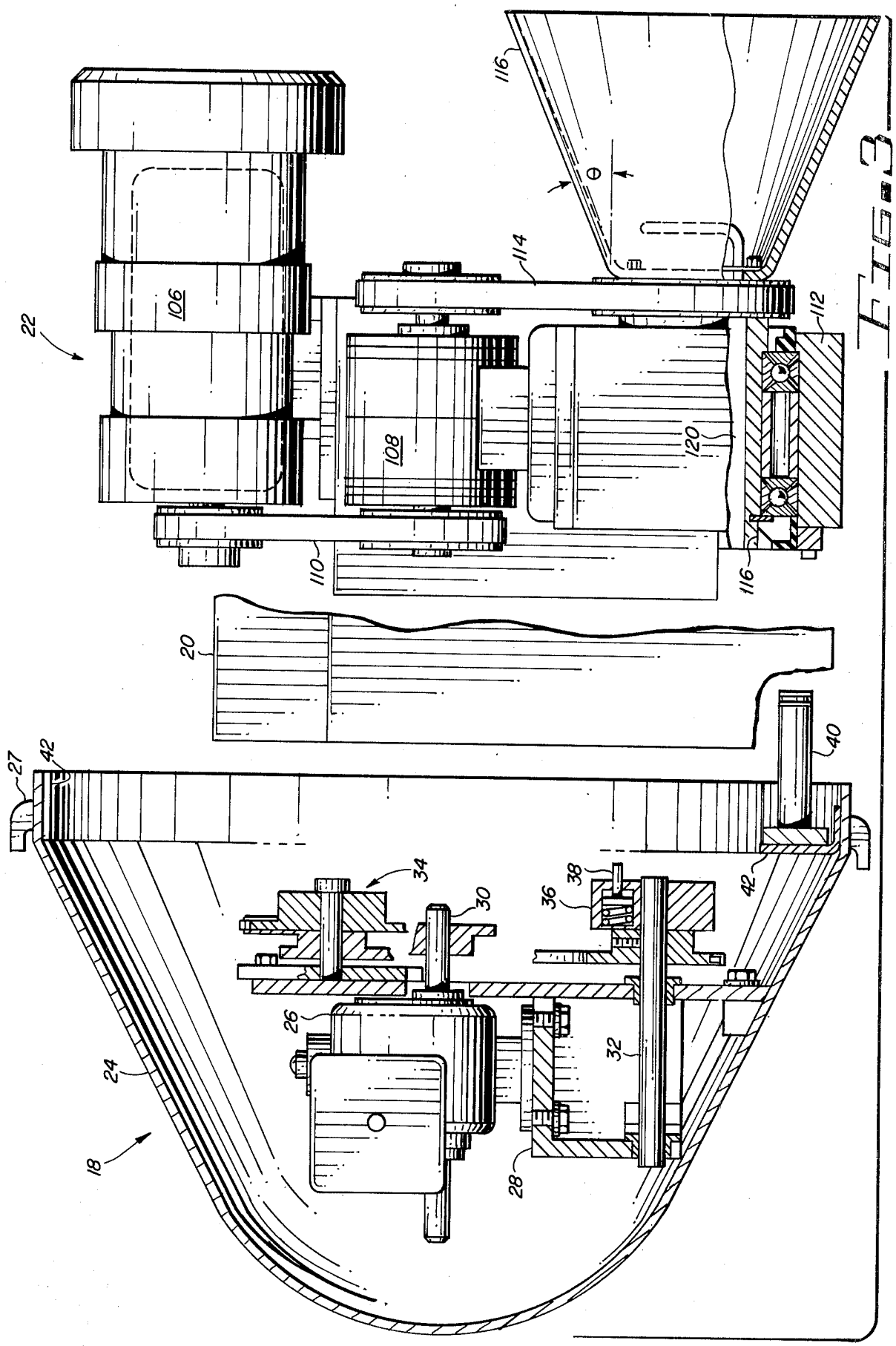
FIG. 3 is a side elevational view, partly in section, illustrating the major components of the dispersion apparatus shown in FIGS. 1 and 2.

Turning now to the drawings, FIGS. 1 to 3 illustrate one embodiment of the present apparatus which was devised for dispersing dispensers from an aircraft either a fixed-wing aircraft or helicopter. In FIG. 1 the apparatus 10 is shown as being secured to the underside of the wing 12 of a fixed-wing aircraft 14. The device 10 consists of three major components, nose cone assembly 18, hopper and body assembly 20 and the dispersion cone assembly 22. The nose cone assembly 18 includes an outer housing 24 which is forwardly truncated to give an appropriate aerodynamic shape. Drive motor 26 is mounted by bolts to an appropriate mounting base 28 within housing 24. Motor 26 may, for example, be a 24 volt D.C. motor having an output of approximately 30 rpm. The output shaft 30 of motor 26 drives shaft 32 at approximately 200 rpm through appropriate sprocket and chain drive chain assembly 34. The particular speed may vary with the application and is set forth only by way of representation.

A driving coupling half 36 is pinned or otherwise secured to shaft 32. Spring biased coupling pin 38 extends from coupling 36. A generally axially mounting shaft 40 is secured to nose cone housing 24 at bracket 42 at the lower edge of the cone to permit the nose cone assembly 18 to be pivoted to a position to facilitate access to the hopper as will be explained. A pheripheral lip 42 is provided at the rear edge of the cone and is adapted to engage the generally cylindrical hopper body 42. Catch 27 is positioned at the edge of housing 24 to cooperate with a latch 56 on the hopper and body assembly to secure to components in releasable engagement.

Generally cylindrical body 42 includes a forward bulkhead 46. Bulkhead 46 defines an opening 48 for receipt of hopper 50. Axially extending tracks 52, in the form of rectangular channel members, extend along the opposite sides of the body at opening 48. An opening 58 at the lower edge of bulkhead 46 is adapted for receipt of shaft 40 of the nose cone 18. Pylon mast assembly 60 is secured to the upper portion of the outer surface of cylindrical body 42 for attachment to the underside of the aircraft by appropriate means such as bolts.

Hopper and body assembly 20 includes elongate hopper 66 having generally triangular opposite end walls 68 and 70 so the contained material flows to the bottom of the hopper. Cover plate 72 is secured to the top 80 of the tank releasable turn fasteners 74 which permit easy removal of cover plate 72. Top plate 80 is cut-out beneath plate 72 to allow access to the tank interior. A handle 76 is secured to end plate 70. Another handle 78 is secured to the top wall 80 of the tank. Rollers 82 are secured adjacent the opposite tank end walls at opposite sides of the hopper. The rollers are positioned to engage trackor channel 52 in body 42 so the entire hopper assembly may be easily rolled in or out of the body. Spring detents 86 are secured to end wall 70 and may be engaged in brackets 54 and body 42 to secure the tank in position within the body 42.

Feed auger 88 extends axially in the bottom of hopper 50 having a series of flights for transporting material to transfer tube 102 extending axially from end wall 68. A driven half coupling 90 is secured to the opposite end of auger 88 at end wall 70 and is adapted to be placed in driven engagement with driving coupling half 36. Coupling half 90 is provided with a diametral slot 92 for reception of pin 38. An agitator shaft 96 extends axially within the hopper 50 centrally located and above auger 88. Agitator shaft 96 carries a series of spaced-apart radially propelling agitator of mixing blades 98. The agitator is rotatively driven through a belt and pulley arrangement 100 from coupling 90.

Transfer tube 102 delivers material to the dispersion cone assembly 22 which is best seen in FIG. 3. The dispersion cone assembly includes a motor 106 which, for example, is a 24 volt D.C. 7200 rpm motor. The output shaft of the motor drives a clutch and brake assembly 108 through belt and pulley drive train 110. The clutch and brake assembly typically may be of the type sold by Simplatrol Company and designated as Model No. FFCB-8324VDC.

Dispersion cone 110 has a cylindrical extension 120 which is mounted for rotation in bearings 112 and is driven by clutch-brake assembly 108 through pulley and belt drive system 114. Transfer tube 102 projects into cylindrical extension 120 and terminates approximately where conical wall 116 begins to outwardly diverge. The angle of conical wall 116 may vary but the flare angle generally is in the range of approximately 35 to 45 degrees. Cone 110 is rotated at varying speed depending on the conditions and microdispensers to be distributed but typically would be in the range of 2900 to 3600 rpm. Cylindrical housing 44 encloses the dispersion cone assembly.

The dispersion apparatus of the present invention will be more fully understood from the following description of operation. The entire apparatus 10 is mounted on the underside of the aircraft by attachment of pylon 60 to the underside of the wing or to the aircraft body. The nose cone assembly 18 can be rotated to an open position by detaching the latch mechanism 56 and rotating the nose cone assembly about shaft 40. The hopper 50 is extended from hopper body 40 by advancing the hopper or rollers 82 by means of handle 76 and cover plate 20 removed by turn fasteners 74. A biologically active chemical such as an encapsulated pheromone such as Glossyplure is placed in the hopper. An appropriate "sticker" material is also placed in the hopper to provide adhesion to the plants. The hopper is returned to a position in body 42 and the nose cone engaged in place so that coupling halves 42 and 90 are in driving and driven engagement. With the hopper in position, transfer tube 102 extends within the cylindrical extension of dispersion cone 110.

When the aircraft is in position over the area to be treated, motors 26 and 106 are actuated. The specific electrical motor controls are not described in detail as these are conventionally well known in the art.

Upon actuation of the device, auger 80 urges the coated dispensers from the trough through the transfer tube 102 where the dispensers are deposited at the intake end of conical section 116. The conical section 116 is rotated in high speed and will urge the coated, microdispensers along the interior surface of the cone and where they are ejected at the rearward open end of the cone generally tangentially to the axis of the cone. The forward motion of the aircraft produces a rearwardly flowing airstream which will tend to deflect the tangentially moving microdispensers to a horizontal direction where they fall and attach to the living organisms.

EXAMPLE

The following tests were conducted dispersing Glossyplure fibers to prove the effectiveness of the apparatus shown in FIG. 1 to 3.

Method

Eight black plastic strips of polyethylene sheeting were laid out in a row paralled to each other, 11 meters apart fastened to bare ground. The sheets were $31 \times 1.1$ meters in size.

Two dispersion units were mounted on mounting brackets on each wing. The units were calibrated to deliver 15 grams per acre. The dispersion units were charged with a 1:2 mix of fiber to Bio-Tac 1, a tradename of Conrel, an Albany International Company, with a sticker substance viscosity of 200,000 at 70° F.

The plane approached from the east and flew over the strips which were parallel to each other in a north-south alignment. The plane flew four runs at 100 mph at a height of 20 to 25 feet over the center of the sheets. Wind was light, 4-5 mph, from the east. Air temperature at 9:00 a.m. was 83° F.

Results

A total of 592 fibers were recovered from the plastic sheeting. Approximately 83% of the dispensers were deposited as a single dispenser or two dispensers in a clump. There were a total of 441 point sources for release of pheromone with single and double dispenser accounting for 94% of these release point sources. Separation of the dispenser released from the cone was quite satisfactory. Most of the dispenser was deposited in the area covered by the wing span of the plane.

The estimated deposition of dispensers in grams per acre absed on a 50 foot swath width and 300 fibers per gram is as follows:

| RUN | NUMBER OF DISPENSERS RECOVERED | ESTIMATED DEPOSITION GRAMS PER ACRE |
| --- | --- | --- |
| 1 | 146 | 16.1 |
| 2 | 168 | 18.6 |
| 3 | 139 | 15.4 |
| 4 | 139 | 15.4 |

Average per run: 16.4 grams per acre.

Figure 4:
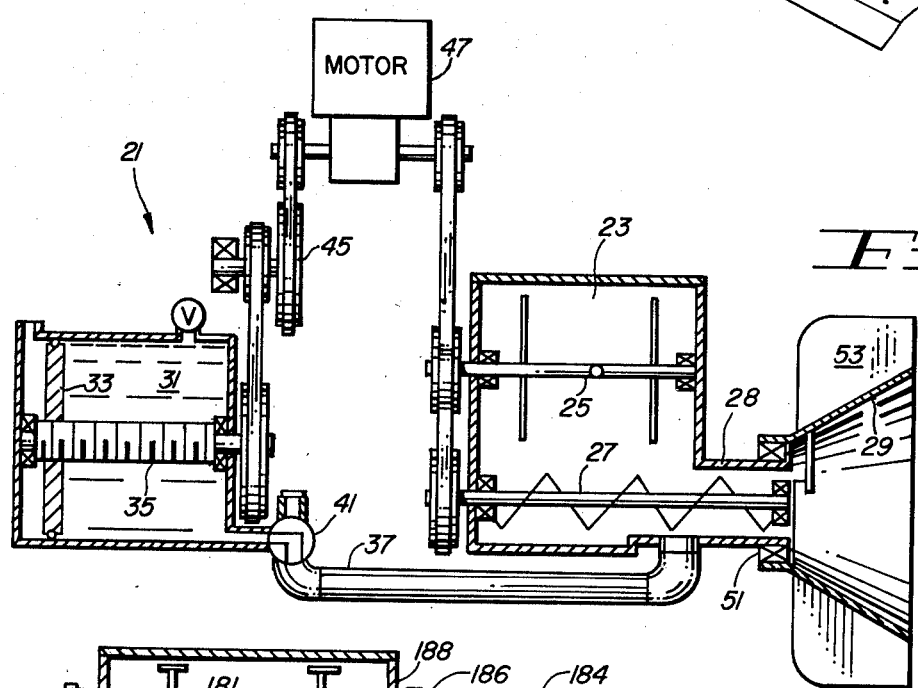
FIG. 4 is a cross-sectional view showing another embodiment of the dispersion apparatus specially adapted for mounting on an aircraft.

FIG. 4 illustrates another embodiment of the present invention which is designated by the numeral 21. This embodiment shown in this figure is similar to that shown in FIGS. 1 to 3. The exterior nose cone and housing for mounting are not shown for clarity of illustration. Embodiment 21 includes a hopper 23 having a rotative agitator 25 mounted therein. An auger 27 is disposed at the lower portion of hopper 23 and extends into a discharge tube 27. The discharge tube 27 communicates with the interior of dispersion cone 29. A separate tank 31 is adapted to receive a sticker substance. Piston 33 is slidable within the cylindrical tank 31 and is in threaded engagement with screw shaft 35. As the piston is advanced, sticker material is caused to flow through conduit 37 which communicates at the discharge end with transfer tube 27 to mix the dispenser and sticker. Valve 41 in conduit 37 controls or meters the flow of sticker substance. Screw shaft 35, auger 27 and agitator 25 are all rotatively driven through belt and pulley drive arrangement 45 powered by motor 47. The relative speed of the components in the drive system may be varied by appropriate selection of pulley sizes as is well known in the art.

Dispersion cone 29 may be motor driven and is mounted for rotation in bearings 51. However, radial turbine blades 53 are shown mounted on the outer surface of cone 29. As the aircraft gains air speed, the flow of the air against the blades 52 will cause cone 29 to rotate at high speed for dispersion of the dispensers. A motor clutch arrangement may be included so that the cone 29 is power driven at lower air speed and air driven at higher air speeds.

FIG. 5 illustrates a distributor for ULV chemicals according to the present invention which is adapted for application by ground traversing vehicles such as tractors and the like. The apparatus is generally designated by the numeral 120 and includes a mounting plate 126 which can be secured to the ground traversing vehicle, indicated generally by dotted lines. A pair of telescoping horizontal frame members 122 and 124 oppositely extend from the mounting plate 130. The telescoping frame members include an outer cylindrical member 128 and inner rod member 129 slidable within cylindrical member 128. A vertical post member 136 is carried at the end of each of the frame members 122 and 124. A hydraulic actuator 130 extends horizontally between mounting plate 126 and post 136 and is attached to the respective members at the rod and head end by a clevis assembly. The dispersion unit 140 is supported at mounting pad 141 at the lower end of rod 137 and is slidable within post 136. A vertical positioning cylinder 134 is secured to a mounting pad 141 at the lower end of the post 137 and is secured at its upper end to a bracket attached to post 136. It will be obvious that the lateral or horizontal position of the dispersion units 140 can be adjusted in accordance with crop or width and other variables. This accomplished by extending the horizontal hydraulic cylinders 130. Similarly, the height of the distributors 140 may be adjusted in accordance with crop height. This is done by extending the vertical rods 137 to an appropriate height by means of vertical positioning cylinders 134. Although the device as shown is designated for hydraulic or pneumatic operation, it is obvious to those skilled in the art that the apparatus could be manually adjusted. The hydraulic cylinders 130 and 134 are conventional and can be operated from any source of hydraulic fluid energy. Appropriate valving, pumps and other components hydraulic circuit have not been shown as these are conventional and well known in the art.

Distributor 140 is shown in greater detail in FIG. 6. Distributor 140 includes a hopper 142 adapted to receive and contain the dispensers. The hopper may be generally rectangular or may be V-shaped in cross-section to deliver the fibers to the auger 144 located in the lower portion of hopper 142. Auger 144 extends into a transfer or delivery section 146 having a lower discharge opening 148. Agitator 150 is positioned within hopper 142 above auger 144 to agitate and break up the dispensers within the hopper. Hydraulic or electric motor 152 drives the auger 144 and agitator 150 through a belt and pulley arrangement 154.

Tank 160 is positioned subadjacent hopper 142 for the containment of sticker material. The sticker material is appropriately selected to coat the dispensers so that the dispensers attach to living organisms. Tank 160 is preferably circular and piston 162 is in sealing engagement with the interior tank walls. The piston 162 is in threaded engagement with axial shaft 164. As shaft 164 is rotated, piston 162 may be caused to advance and retract within tank 160. Outlet 166 communicates tank 160 with the auger transfer tube and delivers sticker to be mixed with the dispensers. The coated dispensers are discharged at opening 148 onto cylindrical applicator roller or wheel 170. Roller 170 and the axial screw shaft 164 are both driven through a chain-sprocket arrangement 154 by motor 152. Typically, applicator roller 170 might be driven at a speed of 15 rpm. As the carriage assembly 120 is advanced along in the field, the coated dispensers are discharged onto the surface of roller 170 and transferred onto plant surfaces which come into contact with the roller.

Figure 7:
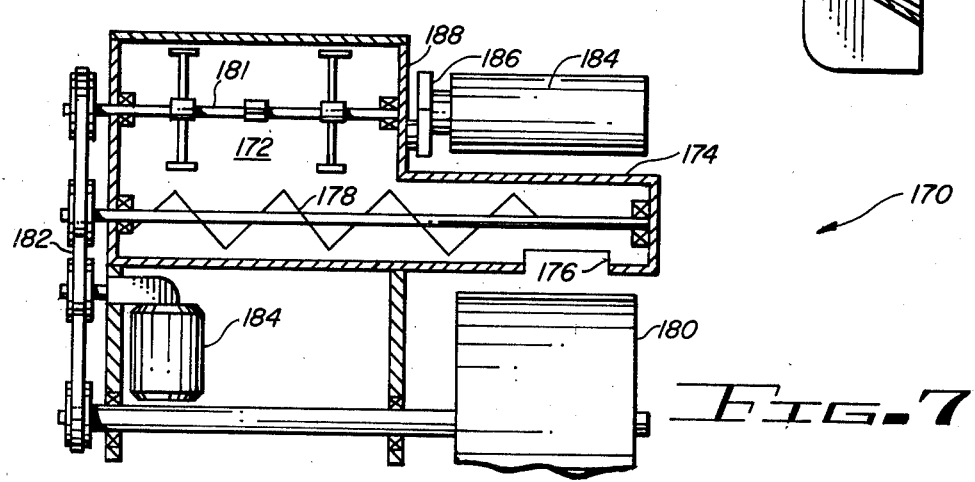
FIG. 7 is a cross-sectional of still another embodiment of the dispersion apparatus adapted for use with ground traversing vehicles.

FIG. 7 shows another embodiment of the present invention adapted for direct application of the dispensers to crops which includes a tank 172 having a discharge tube 174 defining a lower discharge opening 176. An auger 178 is rotated in the lower part of the tank and extends into discharge tube 174. Agitator 180 is positioned above auger 178. Both the dispensers and sticker are mixed within tank 172 and agitator 180 serves to thoroughly stir the contents and insure that the dispensers are properly coated with sticker substance. Roller applicator wheel 180 is mounted at a location directly below discharge 176. The roller applicator 180, auger 178 and agitator 180 are driven through drive chain 182 which is powered by motor 184. Motor 184 may be electric or hydraulic. Roller 184 is mounted on shaft 186 or arm 188. Roller 184 is spaced-apart a pre-determined distance from the surface of applicator roller 180 and serves to break-up any clumps adhering to the surface of roller 180. FIG. 8 best shows the relationship of application roller 180 and roller 184. Preferably arm 188 is spring biased to a position shown in FIG. 7. FIG. 7 also illustrates the transfer of coated dispensers from the surface of the applicator wheel to plants or other living organisms.

It will be obvious to those skilled in the art to make various modifications, variations and changes to the embodiments herein described for the purposes of illustration to the extent that these modifications, variations and changes do not depart from the spirit and scope of the appended claims they are intended to be encompassed therein.

I claim:

1. A method for distributing biologically active chemicals of the ultra low volume type encapsulated in dispensers over a pre-selected area comprising:
    (a) applying a "sticker" substance to the dispensers to coat the dispensers to facilitate attachment to living organisms in the area;
    (b) transferring the coated dispensers to the interior surface of a generally conical distribution device which diverges outwardly from an intake end to a discharge end and depositing the coated dispensers on the surface at least at the intake end of the conical distribution device;
    (c) rotating the conical distribution device at a pre-determined rotational speed thereby moving said dispensers outwardly along the interior surface of said distribution device; and
    (d) discharging said dispensers from said distribution device at said discharge end generally tangentially to the axis of said distribution device over said area.

2. The method of claim 1 wherein said cone is rotated by power means.

3. The method of claim 1 wherein said method is for airborne distribution and said cone is rotated by a moving airstream.

4. The method of claim 1 wherein said rotational speed is approximately 2900 to 3600 rpm's.

5. The method of claim 1 wherein said coated dispensers are transferred to the interiors surface of said distribution device by augering.

6. The method of claim 1 wherein dispensers are first stored in a hopper and said "sticker" substance is applied therein.

* * * * *